United States Patent
Baatz

[15] 3,663,808
[45] May 16, 1972

[54] ILLUMINATED SAFETY CURBING

[72] Inventor: Wilfried Baatz, Bellevue, Wash.

[73] Assignee: Traffic & Safety Control Systems, Inc., Seattle, Wash.

[22] Filed: June 8, 1970

[21] Appl. No.: 44,235

[52] U.S. Cl. ................................240/2, 40/132, 94/31
[51] Int. Cl. ................................................F21v 33/00
[58] Field of Search ..................240/2, 2 B; 40/130, 132; 94/31, 1.5

[56] References Cited

UNITED STATES PATENTS

| 1,546,146 | 7/1925 | Shaffer | 40/130 |
| 1,648,459 | 11/1927 | Mendoza | 94/1.5 |
| 2,503,574 | 4/1950 | Allen | 340/114 UX |
| 2,920,184 | 1/1960 | Kessler | 240/2 |

*Primary Examiner*—Louis J. Capozi
*Attorney*—Christensen, Sanborn & Matthews

[57] ABSTRACT

An illuminated safety curbing construction which utilizes a diving bell configuration to protect illuminators from damage by water entering the structure and employing hidden fastening means to secure its translucent cover to its base. Single- or double-faced elongated illuminated curbing sections are adapted to be combined in various configurations with a nose section to form curbings and dividers for different traffic separator situations. Special fastening means provide flexibility and ruggedness to withstand the impact of vehicle wheels.

10 Claims, 10 Drawing Figures

Patented May 16, 1972
3,663,808
2 Sheets-Sheet 1
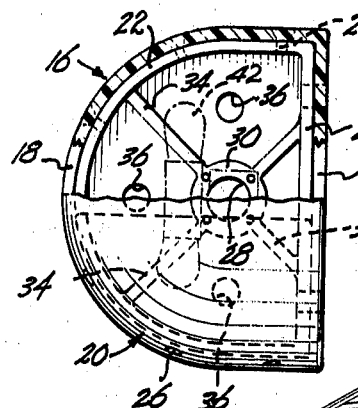
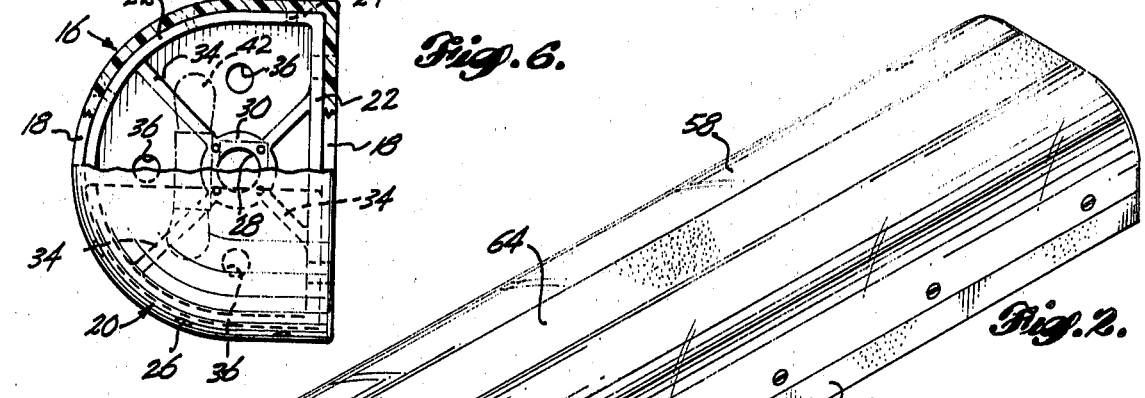
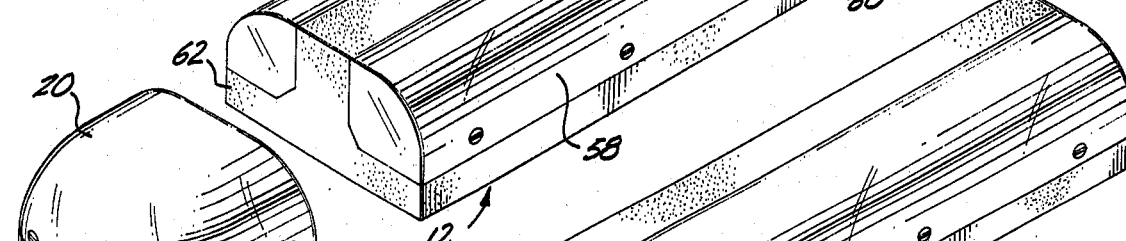
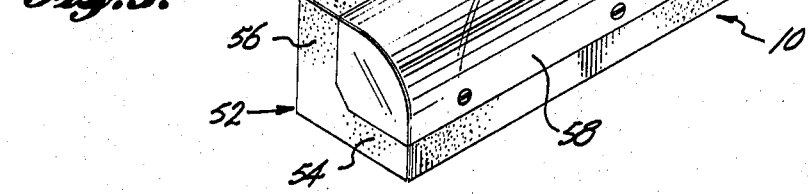
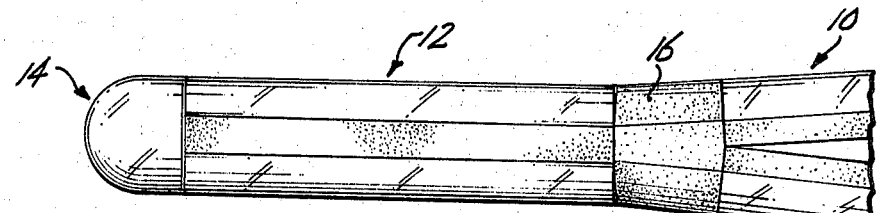
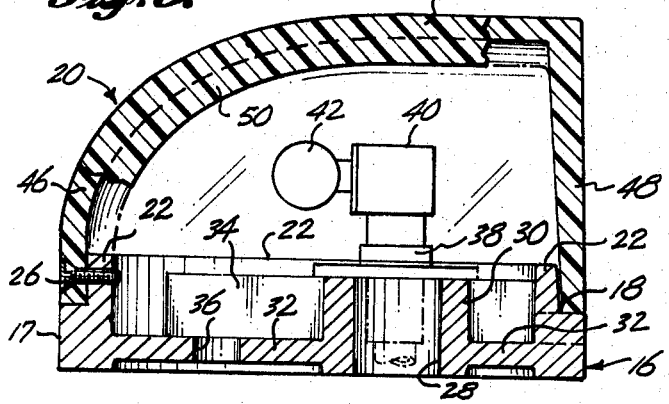
INVENTOR.
WILFRIED BAATZ
BY Christensen, Sanborn & Matthews
ATTORNEYS

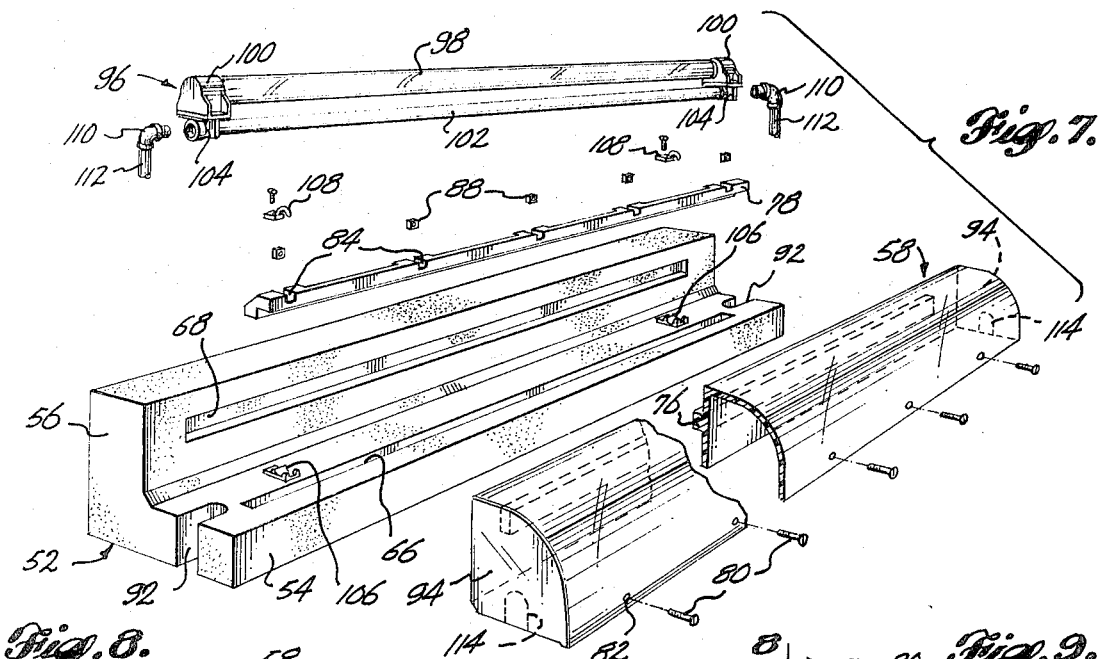
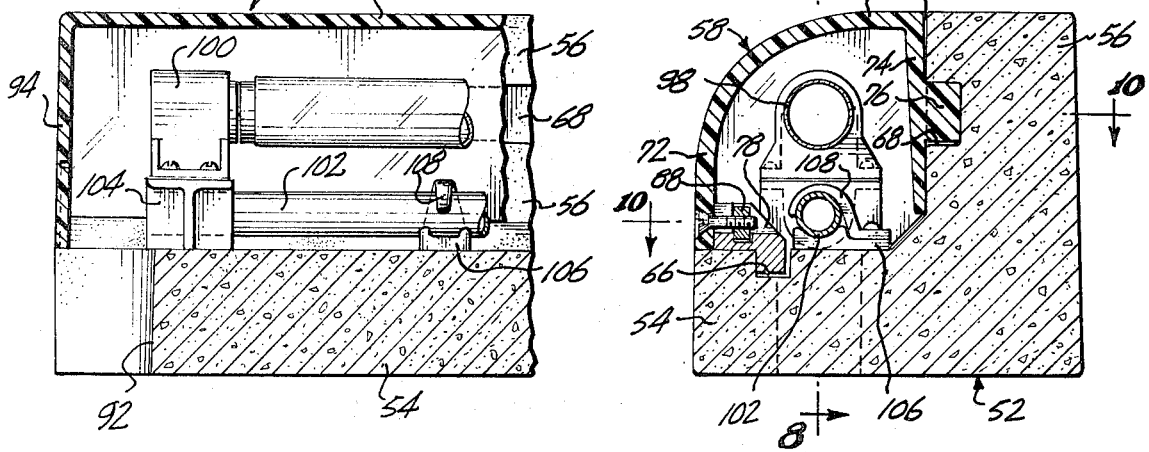
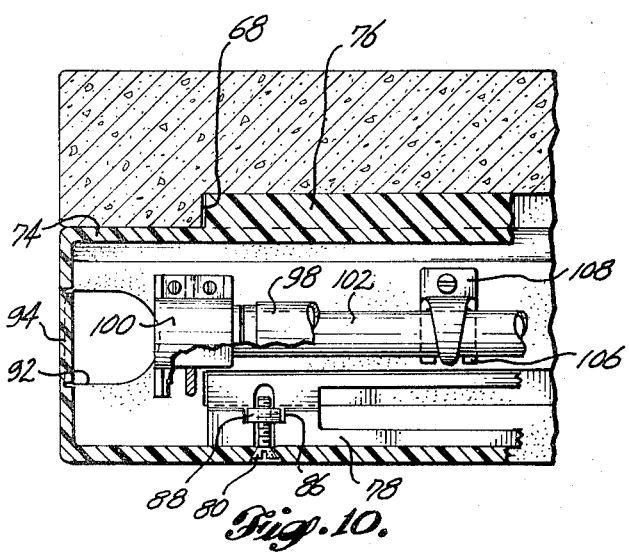
INVENTOR.
WILFRIED BAATZ
ATTORNEYS

3,663,808

ILLUMINATED SAFETY CURBING

BACKGROUND AND SUMMARY OF THE INVENTION

This invention relates to an illuminated curbing construction and in particular to constructions which utilize a diving bell configuration to protect internal illuminator means and wiring connections against entry of water. The invention also resides in particular configurations of curbing sections, including elongated single- and double-faced sections and a terminal section referred to as a nose section, and in hidden fastening means utilized in assembling the structure.

Prior constructions for illuminated curbings and the like have had a number of disadvantages limiting their usefulness under the severe conditions existing on high-speed freeways and high-density arterials. In particular, such prior constructions have not been sufficiently strong or durable, and they have required means for sealing against the entry of water or means for waterproofing internal illuminators. No known prior construction has been adequately designed to perform successfully the dual functions of acting as a portion of regular curbing for daytime traffic separation and roadway marking and as an illuminated marker under conditions of poor visibility. Further, they have been insufficiently adapted for ease of construction, installation and maintenance.

In overcoming the disadvantages of prior devices, the invention provides a new illuminated traffic delineator and marker designed to provide traffic engineers an effective new design component to increase safety under conditions of poor visibility. The illuminated curbing construction disclosed herein preferably employs a reinforced, pre-cast concrete base with an extra heavy-duty translucent fiberglass cover of diving bell configuration which houses an incandescent or fluorescent illumination fixture. The fiberglass cover is extremely durable, provides soft, even light diffusion and prevents water from entering the space occupied by the fixture and causing a short circuit.

Three basic configurations are disclosed herein, namely a nose terminal, a single-face curbing section and a double face curbing section. Other configurations including inside and outside curves are also possible. These basic components may be used as independent units or in combinations to meet the requirements of virtually any roadway or traffic separator design. The cross-sectional shape of the curbing blends easily with conventional curbings and the deep base design permits future roadway resurfacing without disturbing existing installations.

More specifically, the combination according to the invention includes a base structure, a light transmitting cover having airtight top and side walls integrally connected and open at the bottom to form a diving bell configuration for preventing entry of water above a predetermined level therein by virtue of the air trapped within the cover. Means are provided for securing the cover to the base structure, and for mounting the illuminators on the base structure within the bell-like cover above the predetermined water limit level.

The base structure preferably includes an upright portion outside the cover which extends to a height substantially equal to that of the cover to support the weight of vehicles driving over the curbing and strengthening it against high speed impact. The cover is preferably made of a high strength resilient translucent material such as fiberglass.

In one form of the invention the base and cover have a generally semicircular shape when viewed from above to form a nose section for use at the end of a highway divider or other curbing structure. In other forms the combination includes an elongated single-face or double-face curbing, either straight or slightly curved, for use in different traffic delineator configurations.

The means for securing the cover to the base structure is virtually completely hidden from view. Either the upright base portion or the adjacent back wall portion includes an elongated keyway, while the other includes a corresponding elongated key adapted to be received in the keyway. A fastening means at the front of the structure secures the front of the cover to the horizontal base portion and holds the key in the keyway, preventing vertical, horizontal or longitudinal relative movement between the cover and base. The key and keyway terminate short of the ends of the curbing section so that they are not visible.

The invention also resides in certain other advantageous details of construction, as will be more apparent from the following detailed description of preferred forms of the invention illustrated in the accompanying drawings.

BRIEF DESCRIPTION OF THE DRAWINGS

FIG. 1 is an isometric view of a single-face illuminated curbing section according to the invention.

FIG. 2 is an isometric view of a double-face illuminated curbing section according to the invention.

FIG. 3 is an isometric view of a nose section of illuminated curbing according to the invention.

FIG. 4 is a plan view of an assembled traffic divider utilizing a nose section, a double-face curbing section and single-face curbing sections (partially shown) in accordance with the invention.

FIG. 5 is an enlarged sectional side view of the nose section shown in FIG. 3.

FIG. 6 is a partially sectioned plan view of the nose section shown in FIG. 3.

FIG. 7 is a perspective, partially sectioned and disassembled view of a single-face curbing section according to the invention.

FIG. 8 is a sectional front view of the end portion of the assembled illuminated curbing construction showing the manner in which the illuminator fixture is mounted therein, taken along lines 8—8 of FIG. 9.

FIG. 9 is a sectional end view of the single-face illuminated curbing configuration of FIG. 8.

FIG. 10 is a partially sectioned plan view of the single-face curbing shown in FIGS. 8 and 9, taken along lines 10—10 of FIG. 9.

DESCRIPTION OF THE PREFERRED EMBODIMENTS

In accordance with the invention various illuminated curbing sections are assembled in different combinations to form curbings and markers along the sides of roadways or traffic separators at intersections, exits, entrances and the like. The illuminated curbing serves in the same fashion as an ordinary concrete curbing during conditions of good visibility. It is sufficiently visible without illumination under normal daytime conditions and appears simply as a painted curbing. When illuminated at night, or under daytime conditions of poor visibility, the curbing serves as an illuminated marking clearly delineating the intended traffic channel or division without necessity for auxiliary external illumination. The fiberglass cover can be colored for different traffic marking purposes. The single-face curbing 10 of FIG. 1, the double-face curbing 12 of FIG. 2 and the nose or terminal section 14 of FIG. 3 may be assembled, for example, in the traffic separator configuration illustrated in FIG. 4. The double-face curbing section 12 lies between parallel portions of roadway, while the single-face curbing sections 10 diverge as the roadways diverge and they are separated from the double-face section by a connector 16 of concrete or other suitable material.

While the nose section and the elongated single- and double-face curbing sections differ somewhat in construction, they have important features in common. The construction of the nose section 14 is best shown in FIGS. 5 and 6. The base 16, which can be constructed of steel, cast iron or concrete, has a generally semicircular shape in the plan view. The outer rim 17 includes a shoulder or seat 18 adapted to receive the cover 20, and a peripheral flange 22, the outer semicircular portion of which has spaced holes 24 for receiving screws 26 which secure the cover to the base. No screws are included along the straight back of the nose section, since these are not needed and would be inaccessible when the back of the nose section is abutted against the end of the double-face curbing section 12, for example.

In the center of the nose section is an electrical conduit receiving hole 28 in the tubular portion 30 which is connected to the rim of the nose section by horizontal web portions 32 and radial ribs 34. In the center of the three forward web portions 32 holes 36 are optionally included for drainage or for spiking or otherwise fastening the nose section to the pavement or other supporting surface.

The tubular portion 30 extends to a level above the rim seat 18 upon which the lower edge of the translucent cover 20 rests. On top of the tubular portion a flanged mount 38 is secured to support an electrical illumination fixture 30 thereon. Incandescent (or other) illuminators 42 are thus supported within the nose section well above the lower edge of the translucent cover so that under flooding conditions water cannot reach the fixture by virtue of the diving bell configuration of the cover 20. Electrical connections are made within the fixture 42 out of reach of water entering the base. Hence there is no need for elaborate water seals in the curbing structure.

The cover 20 is made of a high-strength, resilient, light transmitting material such as fiberglass, and consists of a top portion 44 and forward and rear downwardly extending side wall portions 46 and 48 integrally connected to form a diving bell configuration which is curved on the front and substantially straight and vertical on the back. One or more reinforcing ribs 50 may be included in the cover 20. The rib extends from the rim flange 22 at the front to the vertical side wall 48 at the back to strengthen the cover against vehicle impact while still permitting flexibility to prevent breakage. The cover 20 can be easily removed by removing the screws 26 to replace the illuminators 42. The outer rim 17 of the base is of sufficient height to permit roadway resurfacing without disturbing the installation.

While the diving bell principle is employed in the elongated single- and double-face illuminated curbing configurations of FIGS. 1 and 2, just as in the nose section 14, the translucent cover and the base structure differ from that of the illustrated nose section in important respects. The base 52 of the single-face curbing includes a front or lower horizontal portion 54 and an upright or rear portion 56 forming substantially a right angle with the front portion 54. The translucent fiberglass cover 58 has an elongated quarter-round configuration occupying the angle formed by the front and rear portions of the base structure. (The nose section may also be constructed with such an upright back portion).

The double-face curbing section 12 of FIG. 2 merely comprises two single-faced curbings back to back with a single base structure having first and second lower or front portions 60 and 62 and a single center upright portion 64 which has a thickness greater than but less than double that of the upright portion 56 of the single-face curbing. Otherwise the construction of the single-face and double-face curbing sections are identical, having interchangeable translucent coverings 58 and internal illumination fixtures and securing means.

The base structures are preferably made of concrete or similar material, but it is generally not practical for them to be formed at the installation site since they are constructed to more precise dimensions than are generally possible on location. In other words, the invention contemplates preferably prefabricated illuminated curbing units which can be installed as the curbing or portions of the curbing at any location in which an illuminated curbing marker is advantageous or required. The illuminated curbing is fastened to the roadway or supporting surface by any suitable means (not shown) such as pins, spikes or an adhesive. Preinstalled subsurface electrical wiring or conduits are appropriately located to deliver electrical power to the curbing at the critical locations.

The partially hidden securing means includes an elongated longitudinal keyway 66 in the lower portion 54 of the base 52 and a similar elongated longitudinal keyway 68 in the upright portion 56. In each case the keys and keyways extend less than the full length of the unit. The translucent cover 58, which has a curved top portion 70 and front wall portion 72 and a vertical rear wall 74, includes an elongated longitudinal key 76 which fits into the keyway 68 in the upright portion 56 of the base. A removable elongated key element 78 is received in the keyway 66 in the lower base portion 54. The translucent cover 58 is secured to the removable element by screws 80 which pass through spaced holes 82 in the cover and spaced slots 84 in the key element 78 into nut-receiving notches 86 in which nuts 88 are held to threadably receive the screws. As the screws 80 are tightened into the captivated nuts 88 the cover 58 is tightened into position against its own resilience by the key elements 76 and 78 which then bear against respectively opposite walls of the keyways 66 and 68.

It will be noted in FIG. 9 that the back wall 74 of the cover 58 forms a slight angle with the upright portion 56 of the base structure, leaving a slight angular space 90 therebetween, and that the keys 76 and 78 are slightly smaller than the keyways, leaving some spacing therewithin as well. These tolerances are deliberately provided in order to permit more flexibility to absorb the impact of vehicle wheels striking the translucent cover 58 and flexing it as it responds resiliently to the force of impact. These spacings also provide greater ease of assembly without any loss of security, since looseness between the cover and the base structure is prohibited by the unique construction whereby the keys brace in opposite directions in their respective keyways.

The right-angled shape of the base structure and matching quarter-round shape of the cover not only provides the advantage of hidden fastening elements as described, but also provides support for any vehicle riding across the curbing since the upright portion 56 (or 64) extends to the same height as the translucent, resilient cover portion 58. In addition, as in the case of the nose section, the lower portion 54 is of sufficient thickness to permit resurfacing of the roadway without disturbing the curbing and without covering the removable translucent portion thereof.

The base structure preferably includes vertical holes or slots 92 at the ends of the lower portion 54 to receive electrical conduits beneath the ends 94 of the translucent cover 58, which are closed to complete the airtight diving bell configuration in accordance with the invention.

The illumination fixture incorporated into the curbing may be of the fluorescent or incandescent type, the former being illustrated in the drawings in connection with the elongated sections and the latter in connection with the nose section. The illustrated fluorescent fixture 96 (FIG. 7) comprises an upper illuminator portion including a standard length fluorescent bulb 98 and end sockets 100, and a lower conduit portion including a tubular conduit 102 and end mountings 104. The fixture is preferably preassembled by securing the end sockets 100 to the end mountings 104 for installation of the entire fixture as a unit, with the conduit 102 threadably interconnecting the end assemblies. The entire fixture is secured to the lower portion 54 of the base structure by a pair of two-piece clamps, the lower portions 106 of which are fastened to the base structure and the upper hook portions of which are fastened to the mountings 106 upon installation. Elbow sections 110 are coupled to mountings 104 and to conduits 112 and are received in the end slots 92 to complete the installation.

It is important to note that the illuminator 98 is mounted within the diving bell configuration of the translucent cover 58 well above the lower edges of the downwardly extending side walls, just as in the nose section. Hence water entering the illuminated curbing under flooding conditions cannot reach the illuminator because of the air compressed within the cover. The vertical distance from the lower edges of the cover wall is generally sufficient to accommodate normal roadway grades so that the illuminated curbing can be employed on slopes without danger of being flooded. While the entire fixture including the conduit portion thereof may be mounted above the lower edges of the translucent cover, this is generally not necessary since the subsurface electrical wiring employed is covered by a waterproof insulating jacket anyway. It is only necessary that the electrical connections, which are made within the socket elements 100, be kept dry to avoid short circuits under flooding conditions.

When a number of curbing sections are mounted in a row, and the potential for flooding is slight, it may be preferred to utilize a straight connecting conduit coupled between adjacent curbing sections and aligned with conduits 102, rather than utilizing elbows or "U" connectors passing beneath the edges of end walls 94 of adjacent translucent covers 58. Hence knock-outs 114 are provided in the end walls.

While various modifications may be employed to accommodate particular roadway and curbing illumination requirements, the combinations of features disclosed herein provide illuminated curbing constructions adapted to most situations. The relatively simple, yet rugged and durable structures are easily installed and maintained and enhance roadway safety to a significant degree. Other advantages will be apparent to those skilled in the art.

What is claimed is:
1. An illuminated curbing construction comprising:
 1. a base structure adapted to be secured to a supporting surface;
 2. a light transmitting cover mounted on said base structure and having airtight top and side walls integrally connected and open at the bottom to form a diving bell configuration for preventing entry of water above a predetermined level therein;
 3. means for removably securing said cover to said base structure; and
 4. illuminator means mounted on said base structure and within said cover above said predetermined level.
2. The illuminated curbing construction defined in claim 1 wherein:
 1. said base structure includes a horizontal base portion beneath said cover and an upright base portion outside said cover and of substantially the same height as said cover; and
 2. said cover includes an upright back wall engaging said upright base portion and interconnected top and front wall portions extending from said back wall to said horizontal base portion.
3. The illuminated curbing construction defined in claim 2 wherein said securing means comprises
 1. a horizontal keyway formed in one of said upright base portion and cover back wall and a corresponding horizontal key formed on the other to engage said keyway; and
 2. fastening means for securing said front wall portion to said horizontal base portion to hold said key and keyway in engagement.
4. The illuminated curbing construction defined in claim 3 wherein said fastening means comprises:
 1. a keyway formed in said horizontal base portion and extending substantially parallel to said upright base portion;
 2. a removable key element adapted to fit into the keyway in said horizontal base portion; and
 3. means for fastening the front wall portion of said cover to said removable key element.
5. The illuminated curbing construction defined in claim 3 wherein said key and keyway terminate at each end thereof at points spaced from the ends of said upright base portion and cover back wall.
6. The illuminated curbing construction defined in claim 5 wherein said keyway is formed in said upright base portion and said key is formed on said cover back wall.
7. The illuminated curbing construction defined in claim 2 wherein said base structure and cover are elongated to form a curbing section for installation parallel to a roadway.
8. The illuminated curbing construction defined in claim 7 including first and second such horizontal base portions connected on opposite sides of said upright base portion and first and second parallel cover portions mounted thereon to form a double face curbing for installation between parallel roadways.
9. The illuminated curbing construction defined in claim 1 wherein said base structure and cover have parallel substantially straight rear surfaces and substantially curved front surfaces to form a nose section for installation at the end of a curbing structure.
10. The illuminated curbing construction defined in claim 9 wherein said base structure includes an upright peripheral flange spaced inwardly from said surfaces and extending upwardly into said cover, and said securing means comprises a plurality of fasteners spaced horizontally along said front surfaces and securing the lower edge of said cover to said flange.

* * * * *